(12) United States Patent
Rogers et al.

(10) Patent No.: US 7,479,714 B1
(45) Date of Patent: Jan. 20, 2009

(54) APPARATUS AND METHOD FOR MULTIPLE-MODULE ELECTRONIC SYSTEM POWER CONTROL

(75) Inventors: Frederick C. Rogers, Olathe, KS (US); Lyle T. Bertz, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 93 days.

(21) Appl. No.: 11/559,000

(22) Filed: Nov. 13, 2006

(51) Int. Cl.
*H02J 3/14* (2006.01)
(52) U.S. Cl. .......................................... 307/38
(58) Field of Classification Search .................. 307/24, 307/29, 38, 11, 18, 20
See application file for complete search history.

(56) References Cited

U.S. PATENT DOCUMENTS

| | | | |
|---|---|---|---|
| 4,695,946 A | 9/1987 | Andreasen et al. | |
| 5,586,333 A | 12/1996 | Choi et al. | |
| 5,603,040 A | 2/1997 | Frager et al. | |
| 5,644,174 A * | 7/1997 | Cheng et al. | 307/41 |
| 5,734,585 A | 3/1998 | Beard | |
| 6,192,481 B1 | 2/2001 | Deenadhayalan et al. | |
| 6,611,563 B1 * | 8/2003 | Davis et al. | 375/242 |
| 7,305,572 B1 * | 12/2007 | Burroughs et al. | 713/300 |
| 2003/0005339 A1 | 1/2003 | Cohen et al. | |
| 2003/0105984 A1 * | 6/2003 | Masuyama et al. | 713/330 |
| 2005/0055587 A1 | 3/2005 | Lee | |
| 2005/0102539 A1 | 5/2005 | Hepner et al. | |
| 2006/0107033 A1 | 5/2006 | Yasumuro | |

* cited by examiner

*Primary Examiner*—Stephen W Jackson
*Assistant Examiner*—Michael Rutland Wallis

(57) ABSTRACT

A method for controlling power consumption of an electronic system is provided. The electronic system includes a number of modules, such as, for example, processing units, server blades and disk drives. In a predetermined sequence, application of power to each module is initiated. Each initiation of the application of power to a module is followed by a waiting period associated with that module.

17 Claims, 7 Drawing Sheets

APPARATUS AND METHOD FOR MULTIPLE-MODULE ELECTRONIC SYSTEM POWER CONTROL

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

Aspects of the invention relate generally to multiple-module electronic systems, and more particularly to power control of multiple-module electronic systems.

2. Description of the Prior Art

Many electronic systems, including a variety of computing systems or platforms, employ a number of separate components or modules coupled together to operate in a cooperative manner to perform one or more tasks or functions. Further, some of these systems may form a system hierarchy, wherein a number of components may form one or more subsystems, the subsystems are grouped to form larger subsystems, and so on. In one example, a switch for a telephone system, such as a Public Switched Telephone Network (PSTN), may include one or more network elements, wherein each element includes one or more network servers, such as blade servers. Other modules, such as data storage subsystems like disk drives, may also be included in the switch. Myriad other electronic systems representing a virtually unlimited number of system configurations also exist.

Each such electronic system requires one or more electrical power supplies to allow the system to operate. Each component or module of an electronic system typically consumes electrical power at a rate determined by the electronic design of the module, the particular components employed, and other factors. Typically, the power consumption of each module is not constant, but instead changes depending on the particular functions being performed by the module. More specifically, many modules consume significantly more power for a period of time immediately after being turned on or activated. Thereafter, the power consumption typically moderates to a more-or-less constant, or "steady-state," power level below the "start-up" power level. For example, disk drives are well-known for consuming a significant amount of power shortly after being activated so that the disks of the drive may be "spun-up" to their normal operating rotational speed. After that rotational speed is attained, the power requirements of the disk drive normally decrease. Similarly, computer processing modules may have cooling fans associated therewith which initially require more power to spin up to an operating speed. These processing units may also perform intensive testing of various components, such as memory and other peripheral integrated circuits, which may also temporarily require additional power. Many other examples also exist.

Typically, all modules of an electronic system are powered up essentially simultaneously. As a result, the system requires a relatively large amount of power initially before reducing its demands, typically over a few seconds. Accordingly, power supplies used for such systems, as well as the building or other infrastructure tasked with transferring the power from a power grid to the power supplies, are designed to provide that peak power demand during a power-up cycle. Since the instantaneous power requirements of a system typically drop significant within a few seconds or so of initial power-up, the power supply and related infrastructure typically are designed and manufactured to provide a level of power much higher than required for normal steady-state operation of the electronic system in question. Such designs often result in a waste of financial resources on power consumption requirements that the enterprise operating the system could deploy elsewhere.

SUMMARY OF THE INVENTION

One embodiment of the invention, described below, provides a method for controlling power consumption of an electronic system having a plurality of modules. Application of power to each module is initiated in a predetermined sequence. After the initiation of the application of power to each module, a waiting period associated with that module ensues.

Another embodiment of the invention involves an electronic system capable of allowing control over its power consumption. The system includes a number of modules, such as, for example, processing units, server blades and disk drives. Coupled with each of the modules is a control module configured to initiate the application of power to each of the modules in a predetermined sequence. The control module is also configured to wait for a period of time associated with each module after the initiation of the application of power to that module.

In conjunction with these embodiments, a related method for determining a maximum instantaneous power consumption of an electronic system having a plurality of modules is presented. A peak power consumption and a maximum steady-state power consumption is determined for each of the plurality of modules. For each of the modules, the peak power consumption of that module is added to the maximum steady-state power consumption of each of the remaining modules, resulting in a maximum system power consumption value associated with the peak power consumption of that module. The highest of the maximum system power consumption values is selected as the maximum instantaneous power consumption of the electronic system.

Additional embodiments and advantages of the present invention will be ascertained by those skilled in the art upon perusal of the following detailed description, taken in conjunction with the accompanying drawings.

DETAILED DESCRIPTION OF THE INVENTION

Figure 1:
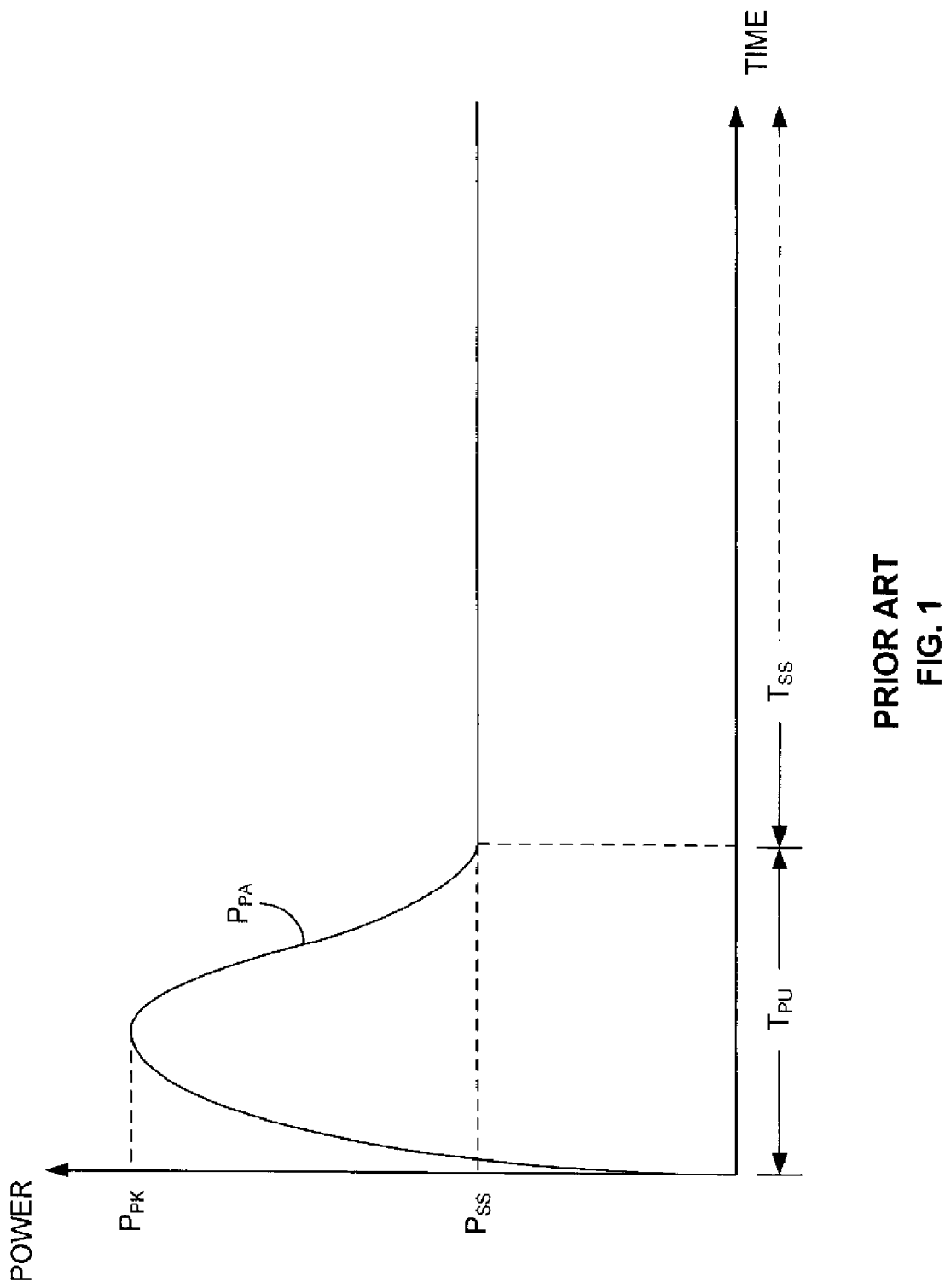
FIG. 1 is a simplified graph of instantaneous power consumption of an electronic system from the prior art.

As mentioned above, electronic systems from the prior art containing several components or modules are designed such that all of the modules are powered-up at essentially the same time. FIG. 1 illustrates a simplified graph of the instantaneous power consumption $P_{PA}$ of a typical electronic system. Normally, each module or subsystem of the electronic system requires more power for a period of time $T_{PU}$ immediately after powering-up the system at $T_0$ than what is required thereafter. After the power-up period $T_{PU}$, the power consumption $P_{PA}$ of the system normally moderates to a somewhat constant power level, sometimes referred to as a "steady-state" power level $P_{SS}$, shown in FIG. 1 during time period $T_{SS}$. As a result of powering-up each of modules simultaneously, a large instantaneous power consumption normally results during power-up time $P_{PU}$ therein exhibiting a peak power consumption $P_{PK}$. Consequently, power supply and distribution systems must be designed to handle the peak power consumption $P_{PK}$, even though the system normally operates at the significantly lower steady-state power level $P_{SS}$.

Figure 2:
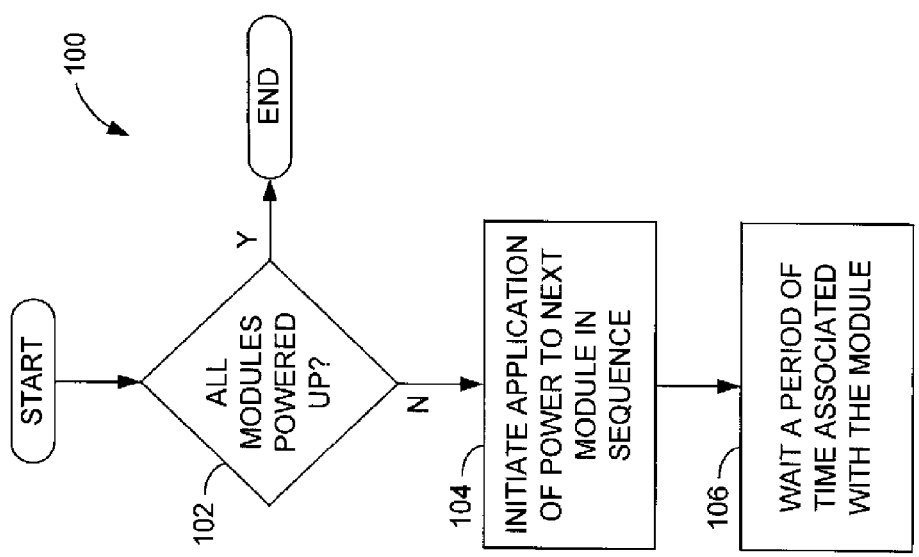
FIG. 2 is a flow diagram of a method according to an embodiment of the invention for controlling power consumption of an electronic system having a plurality of modules.

To address this situation, one embodiment of the invention provides a method 100 for controlling power consumption of an electronic system having a plurality of modules. FIG. 2 graphically illustrates the method 100. If at least one of the modules is not powered up (operation 102), the application of power to the next module in a predetermined sequence is initiated (operation 104). Afterward, a period of time associated with that module elapses before powering up the next module in the sequence (operation 106). The method 100 is completed once all of the modules are powered up. Thus, for each one of the modules, in a predetermined sequence, the application of power to the module is initiated, followed thereafter by a waiting period associated with that particular module.

Figure 3:
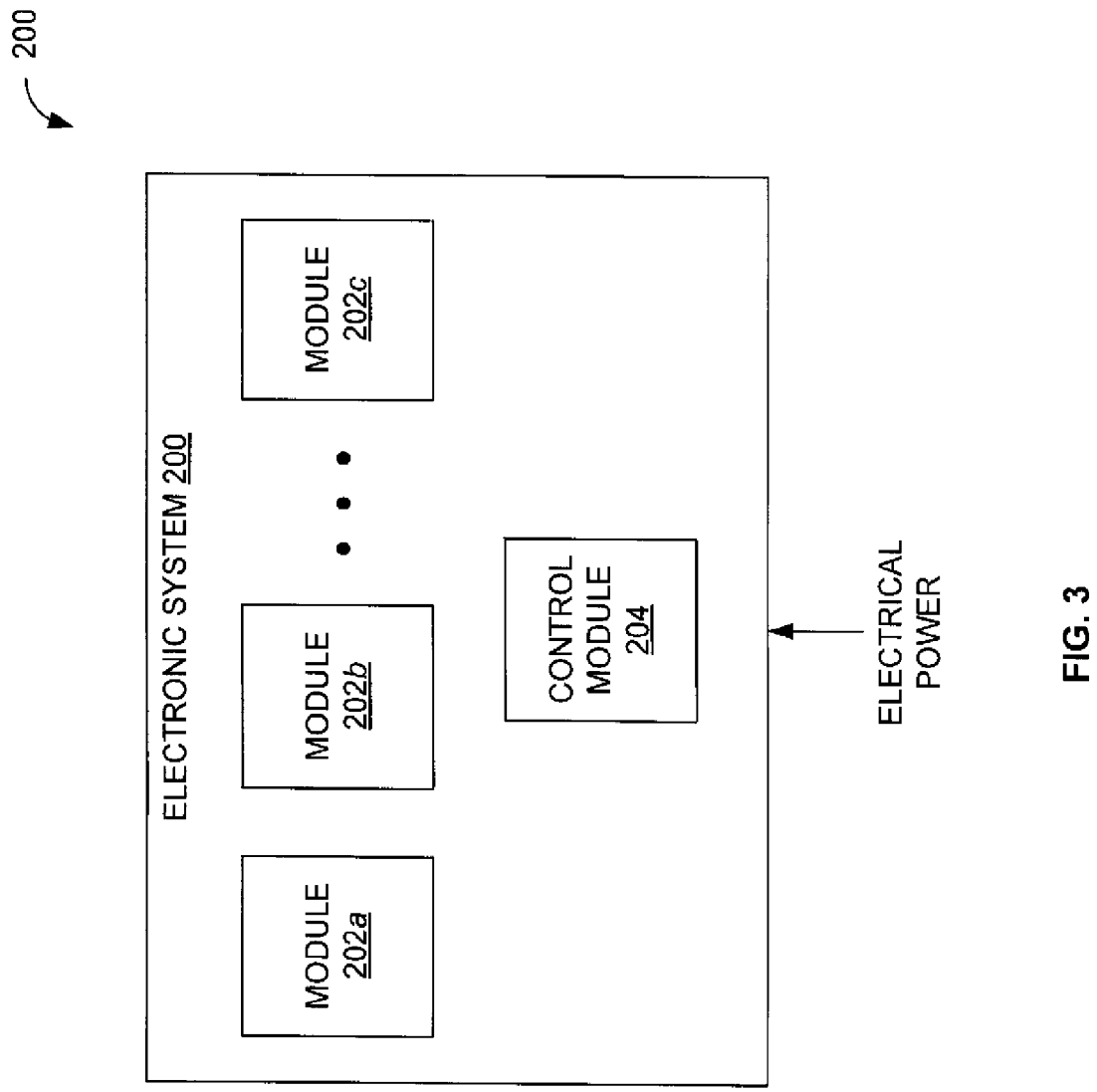
FIG. 3 is a block diagram of an electronic system according to an embodiment of the invention that is capable of allowing control over power consumption by the system.

Similarly, an electronic system 200 according to another embodiment of the invention is depicted in the simplified block diagram of FIG. 3. Within the electronic system 200 are a plurality of modules 202a, 202b, 202c, as well as a control module 204. Although the number of modules 202 shown in FIG. 3 is at least three, the number of modules 202 may be two or higher. The control module 204 is configured to initiate the application of power to each one of the modules 202 in a predetermined sequence. The control module 204 is also configured to wait a period of time associated with the module 202 most recently powered up before continuing with the next module 202 in the sequence.

Figure 4:
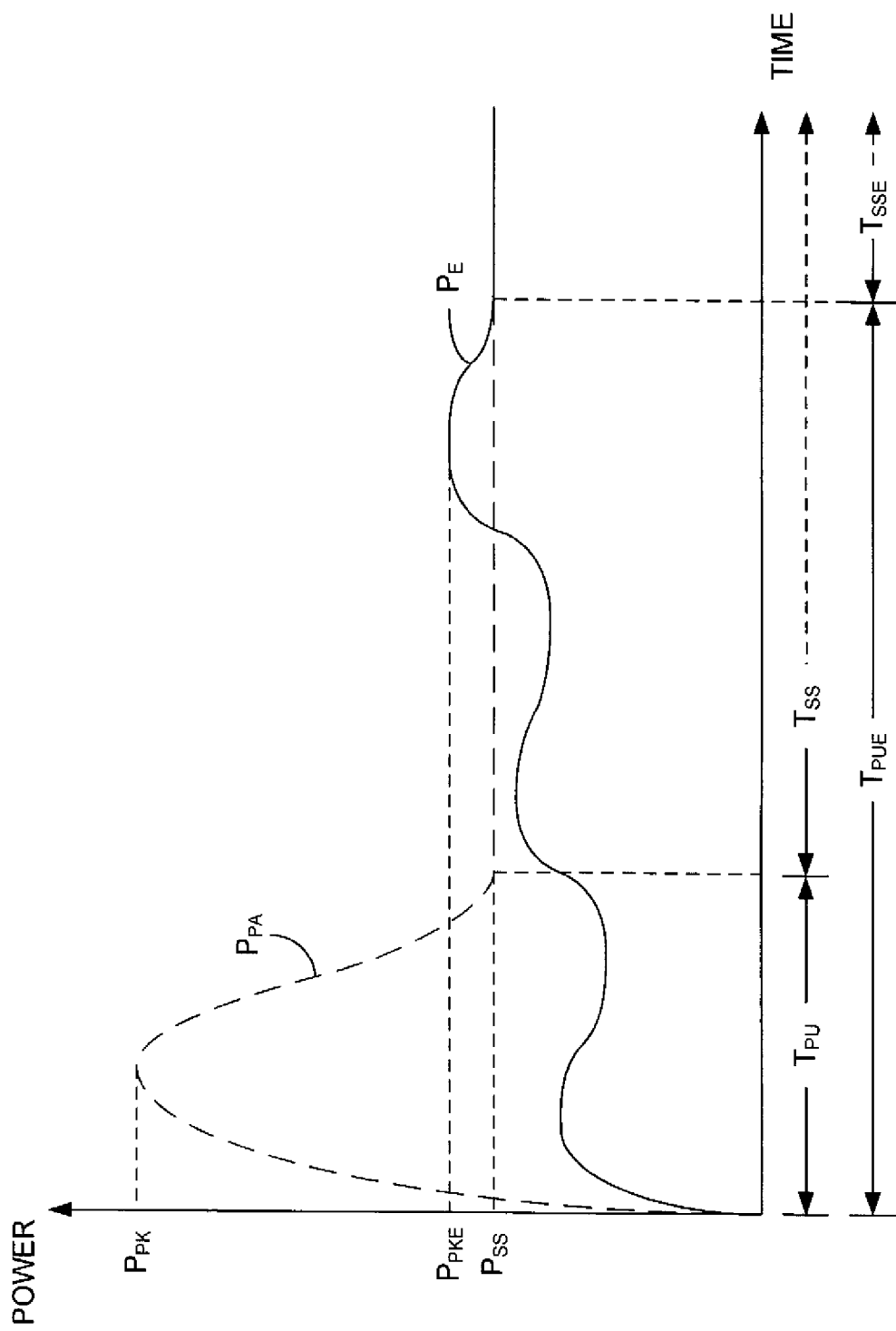
FIG. 4 is a simplified graph of instantaneous power consumption of an electronic system according to an embodiment of the invention.

A graph presented in FIG. 4 shows a possible effect of the embodiments of FIGS. 2 and 3 on the instantaneous power consumption $P_E$ of an electronic system compared to that the prior art. By sequencing the initiation of the application of power to each of the modules 202 of the system 200 of FIG. 3, with appropriate wait periods therebetween, the instantaneous power $P_E$ exhibits a lower peak power consumption $P_{PKF}$ for various embodiments of the invention than the peak consumption $P_{PK}$ previously experienced with the instantaneous power curve $P_{PA}$ of the prior art. As a consequence, the power-up time period $T_{PUE}$ for the modules of the electronic system according to embodiments of the invention is often lengthened, thus delaying the start of the steady-state time period $T_{SSE}$ associated with the embodiments.

Figure 5:
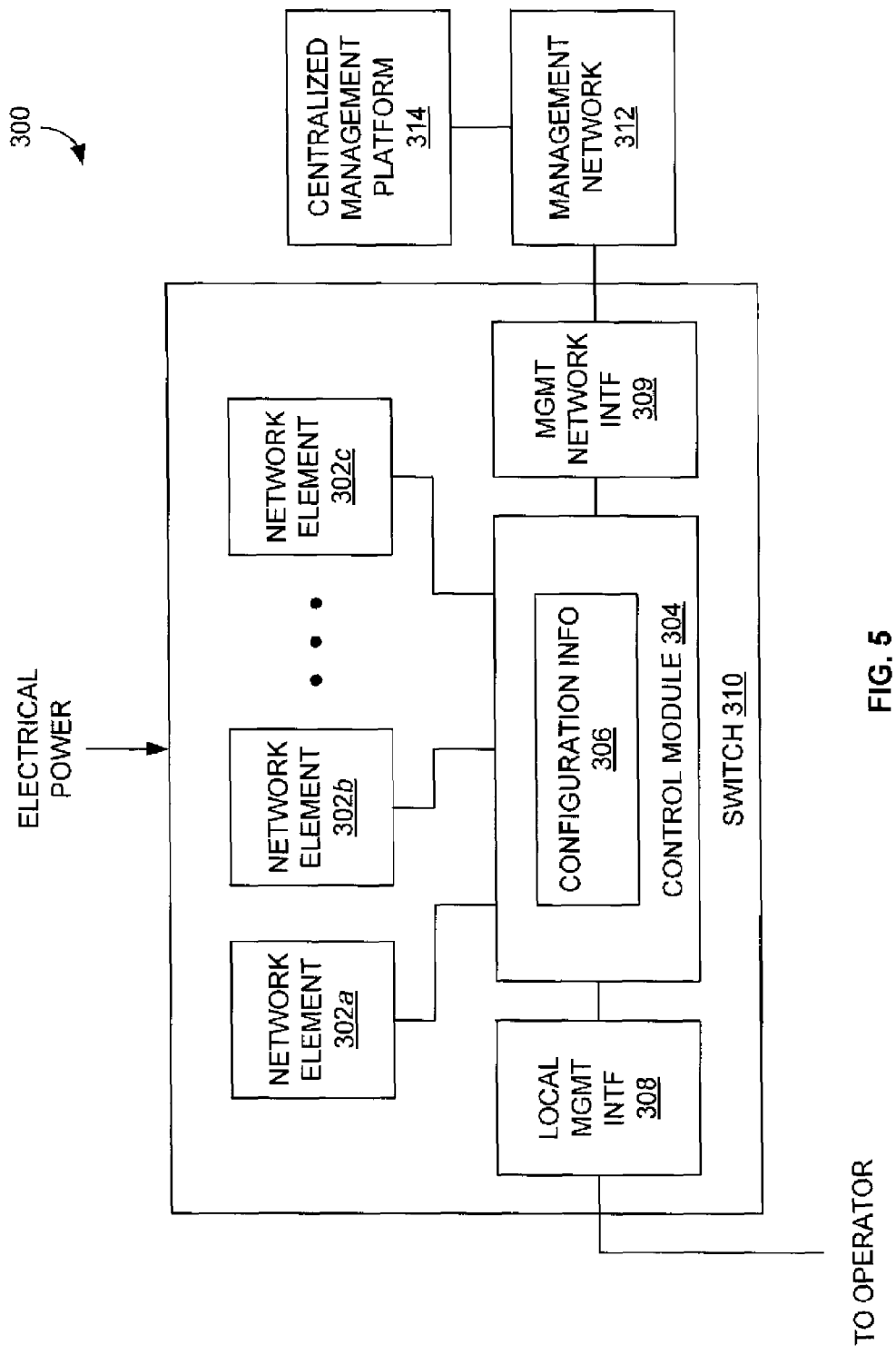
FIG. 5 is a block diagram of a telephonic switch according to an embodiment of the invention that is capable of allowing control over power consumption by the switch.

Another embodiment of the invention is displayed in FIG. 5. Therein, a telephonic switch 310 for a telephony system 300, such as for a public switched telephone network (PSTN), includes several network elements 302a, 302b, 302c, which may be computer servers for carrying on the functions associated with a switch, such as directing a multitude of incoming telephone calls to their appropriate destinations. Other modules, such as disk drives for data storage and fans for system cooling, may also be present within the switch 310.

Also included is a control module 304 configured to control the power-up sequence of the network elements 302. More specifically, the control module 304 is configured to power up each of the network elements 302 in turn according to a predetermined sequence. Further, the control module 304 is configured to wait a period of time associated with the module, such as one of the network elements 302, most recently powered up. In one embodiment, this period of time is related to an amount of time from initiation of the application of power to the element 302 until some time at which the instantaneous power consumption of the element 302 has decreased below a peak value. In one particular implementation, the waiting period extends from initial power-up to the time the power consumption of the module attains a steady-state value, or the module attains a particular operational state.

The exact time value of the waiting period for each module may depend on a variety of factors, including the number of modules involved, the functionality of the modules, the maximum instantaneous power consumption desired for the switch 310 as a whole, and others. For example, to keep the maximum instantaneous power consumption of the switch 310 during the power-up sequence to a minimum, the waiting period for each of the network elements 302 may be as long at the time required from initial power-up until its steady-state power level is reached.

Similarly, the predetermined sequence by which the various network elements 302 and other modules may be determined on the basis of the same or similar factors. For example, if the functionality of a second element 302 may depend on the functionality of a first element 302, the second element 302 may require the first element 302 to be powered-up first before power is applied to the second element 302. In another instance, if the peak power consumption of one element 302 during its initialization is significantly high compared to that of the other elements 302, powering up that element 302 first before any other elements 302 are consuming power may significantly lower the peak power consumption of the switch 310 during the power-up sequence.

The mechanism by which the control module 304 controls the application of power to each of the modules, such as the network elements 302, may take a number of forms. For example, each of the modules may be connected directly with electrical power received by the telephonic switch 310, such as by way of a power bus within the switch 310. In this configuration, the control module 304 employs control signals to selectively activate each of the modules or elements 302 in sequence, typically by way of a closing a mechanical switch located on or closely associated with each of the modules. An electronic switch, such as a power field-effect transistor (FET), may instead be used. In another implementation, the electrical power received into the telephonic switch 310 is routed through the control module 304 to each of the network elements 302 and other modules of the switch 310. As a result, the control module 304 is configured to control the powering sequence of the modules by selectively connecting each of the modules to the electrical power in sequence, possibly by way of a mechanical switch or relay, a power FET, or other means.

Several different processes may be employed by which the control module 304 determines the predetermined power-up sequence and the associated wait periods in powering-up the network elements 302 and other modules of the switch 310. For one, the control module 304 may obtain the predetermined sequence and the wait periods from static configuration information 306 within, or closely associated with, the control module 304 within the switch 310. For example, the static configuration information 306 may be a hardware configuration, such as a group of hardware jumpers, a set of dual in-line package (DIP) switches, or other hardware means. In another implementation, the static configuration information 306 may be embodied as a software configuration, such as data or firmware stored in a read-only memory (ROM) or other form of nonvolatile storage. As a result, the control module 304 is capable of performing the power-up sequence of the modules within the switch 310 autonomously once the control module 304 itself is powered-up. Such sequencing may occur as part of initialization or "bootstrap" code executed by the control module 304 once power is applied thereto. Such a process allows completion of the power-up sequence of the switch 310 as a unit by default after a catastrophic power failure without aid from an external source.

In addition to, or in lieu of, the default power sequencing described above, the control module 304 may receive the predetermined sequence and associated waiting periods from a local or on-site human operator by way of a local management interface 308 within the switch 310. Thus, the operator can dynamically configure the power-up sequencing and the various wait periods involved for the switch 310. In one embodiment, this dynamic configuration may override the static configuration utilized within the switch 310. In that case, the static configuration would be employed as a "failsafe" mechanism in case of a failure of the local management interface 308.

In another embodiment, the switch 310 includes a management network interface 309 through which the control module 306 may receive the sequence and wait period information from a centralized management platform 314 by way of a management network 312. In one implementation, the management network 312 may be an Internet Protocol (IP) network coupled with a number of electronic systems, including the switch 310. Management information may flow between the systems and the centralized management platform 314 by way of a control language, such as the Simple Network Management Protocol (SNMP). As a result, the centralized management platform 314 may control the power-up sequencing of multiple systems remotely. In the field of telephone networks, such systems may include central offices, data centers, telephonic switches, and the like. This power management capability thus allows a remote operator to control the power sequencing of geographically-separated systems in an integrated and controlled manner, especially after a major event, such as a catastrophic power failure of some or all of the systems. In another embodiment, the centralized management platform 314 may retain control of the power sequencing of the systems by overriding the static control and local operator control processes described above.

In one embodiment, the control module 304 may be required to be powered-up and operating for local operator control via the local management interface 308 or remote control from the centralized management platform 314 through the management network 312 and the management network interface 309 to process the power-up sequence and wait periods properly. Thus, after a power failure or similar event, the control module 304 may be required to power up immediately after the return of power, or shortly thereafter, to control the power sequencing of the remainder of the switch 310.

Figure 6:
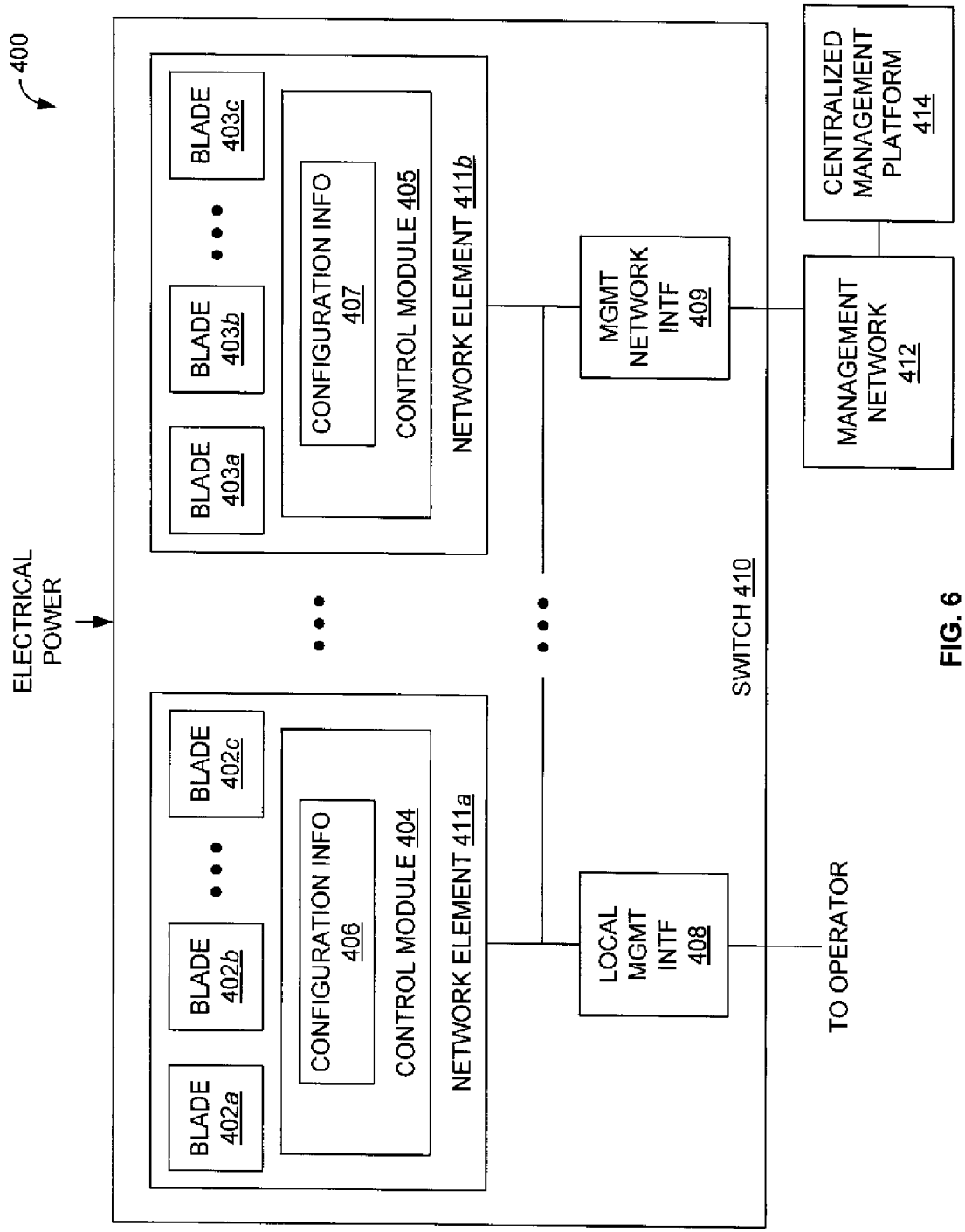
FIG. 6 is a block diagram of a telephonic switch according to another embodiment of the invention that is capable of allowing control over power consumption by the switch.

FIG. 6 illustrates another electronic system 400 that provides power control at a lower hierarchical level of a telephonic switch 410. In this particular example, the switch 410 contains a number of network elements 411a, 4111b. Other modules or elements not shown in FIG. 6 may reside within the switch 410 as well. One of the network elements 411a includes a number of blades 402a, 402b, 402c of a blade server, and a control module 404. Similarly, another network element 411b contains several blades 403a, 403b, 403c and a control module 405. Based on this configuration, each control module 404, 405 may control the power sequencing of each individual blade 402, 403 and other modules within its associated element 411. As with the embodiments of FIG. 5, the power sequencing may be under static control by way of configuration information 406, 407 located within, or closely associated with, its respective control module 404, 405. In addition, local power management by an operator through a local management interface 408, or remote power management by a centralized management platform 414 through a management network 412 coupled to a management network interface 409 of the switch 410, as described above, is also possible. In another embodiment, power management and control is undertaken at both the network element and blade levels.

Figure 7:
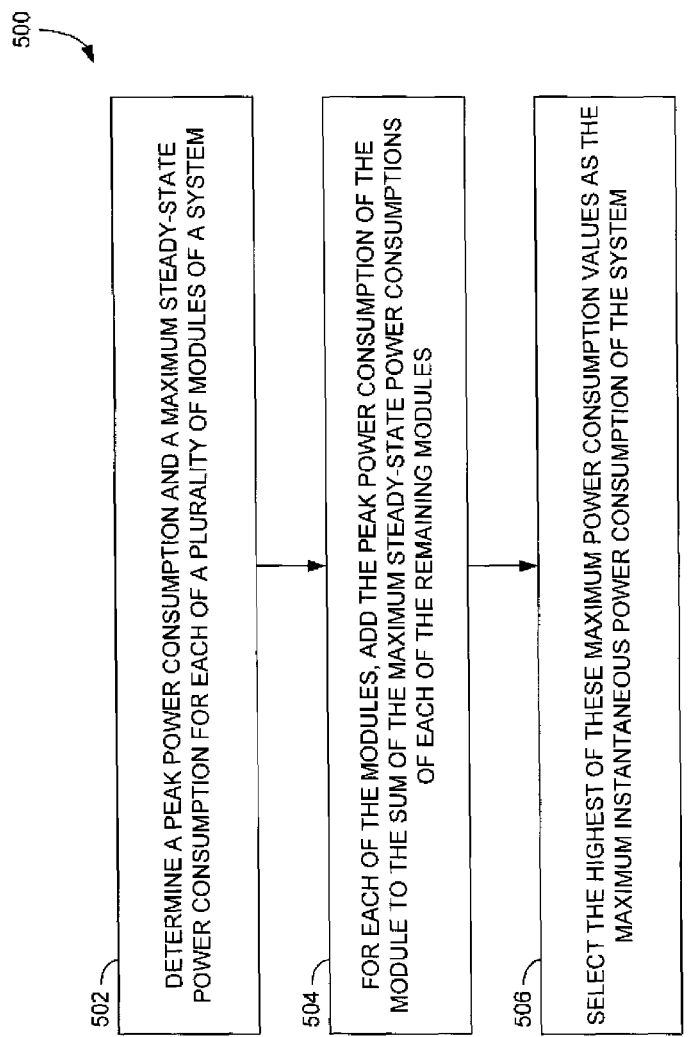
FIG. 7 is a flow diagram of a method according to an embodiment of the invention for determining a maximum instantaneous power consumption of an electronic system having a plurality of modules.

As discussed above, implementation of various embodiments of the invention described herein provides for a lower peak power consumption for an electronic system than what was previously possible. Thus, the design constraints of the power supply and associated transmission system responsible for delivering power to such an electronic system may be relaxed. FIG. 7 provides a simplified flow diagram of a method 500 for determining a maximum instantaneous power consumption of an electronic system having a plurality of modules, assuming the sequencing of power among the modules. First, a peak power consumption and a maximum steady-state power consumption is determined for each of the plurality of modules (operation 502). In one embodiment, the peak power consumption occurs during a power-up of the associated module. For each of the modules, the peak power consumption of the module is added to the sum of the maximum steady-state consumptions of each of the remaining modules (operation 504), thus resulting in a maximum system power consumption value associated with the peak power consumption of the corresponding module. The highest of these maximum power consumption values is then selected as the maximum instantaneous power consumption of the system (operation 506). This maximum power consumption for the system can then be utilized to determine the operational characteristics of the associated power grid and supplies required to power the electronic system.

The various methods of power management and control discussed herein may be embodied in a computer-readable storage medium containing instructions executable on a processor for performing the methods. In other embodiments, the methods may be embodied exclusively in hardware, or in a combination of hardware and software. The processor may be a general purpose computer, a computer designed for the specific purposes discussed herein, an embedded processor, multiple processors coupled together, or any combination thereof.

While several embodiments of the invention have been discussed herein, other embodiments encompassed within the scope of the invention are possible. For example, while embodiments of FIGS. 5 and 6 specifically involve a telephonic switch, other forms of telecommunication systems, such as central offices, data centers, private branch exchanges (PBXs), and so on, may benefit from application of the principles discussed above. Moreover, the methods disclosed herein may be applied to many other types of electronic systems, such as general-purpose computing systems involving multiple processing units, disk storage devices, cooling fans, and other modules. In addition, aspects of one embodiment may be combined with aspects of other embodiments disclosed above to produce additional embodiments not heretofore discussed. Thus, white the present invention has been described in the context of specific embodiments, such descriptions are provided for illustration and not limitation. Accordingly, the proper scope of the present invention is delimited only by the following claims.

What is claimed is:

1. A method for controlling power consumption of an electronic system having a control module and a plurality of power consumer modules, the method comprising:
   applying power to the control module;
   in the control module, determining a power sequence for the plurality of power consumer modules based on a dynamic power sequence if the dynamic power sequence is provided over a management network to the control module and based on a static power sequence if the dynamic power sequence is not provided, wherein the static power sequence is stored in the control module;
   for each one of the plurality of power consumer modules, based on the power sequence:
   initiating application of power to the one of the plurality of power consumer modules; and
   thereafter waiting a period of time associated with the one of the plurality of power consumer modules.

2. The method of claim 1, wherein:
   the period of time is associated with a length of time from initiating the application of power to the one of the plurality of power consumer modules until a time at which an instantaneous power consumption of the one of the plurality of power consumer modules has decreased below a peak value.

3. The method of claim 1, further comprising:
   obtaining the static power sequence from at least one of an electronic hardware configuration and a software configuration.

4. The method of claim 1, wherein:
   the management network comprises an IP network external to the electronics system.

5. The method of claim 1, wherein:
   the electronic system comprises a computer system; and
   at least one of the plurality of power consumer modules comprises one of a processing unit, a disk drive, and a fan.

6. The method of claim 1, wherein:
   the electronic system comprises a switch for a public switched telephone network; and
   at least one of the plurality of power consumer modules comprises a network element.

7. The method of claim 1, wherein:
   the electronic system comprises a blade server; and
   at least one of the plurality of power consumer modules comprises a server blade.

8. A computer-readable storage medium comprising instructions executable on a processor for employing the method of claim 1.

9. An electronic system capable of allowing control over power consumption by the electronic system, the electronic system comprising:
   a plurality of power consumer modules; and
   a control module configured to determine a power sequence for the plurality of power consumer modules based on a dynamic power sequence if the dynamic power sequence is provided over a management network to the control module and based on a static power sequence if the dynamic power sequence is not provided, wherein the static power sequence is stored in the control module;
   wherein the control module is configured, for each one of the plurality of power consumer modules based on the power sequence:
   to initiate application of power to the one of the plurality of power consumer modules; and
   thereafter, to wait a period of time associated with the one of the plurality of power consumer modules.

10. The system of claim 9, wherein:
    the period of time is associated with a length of time from initiating the application of power to the one of the plurality of power consumer modules until a time at which an instantaneous power consumption of the one of the plurality of power consumer modules has decreased below a peak value.

11. The system of claim 9, wherein:
    when applied to one of the plurality of power consumer modules, the power is routed through the control module to the one of the plurality of power consumer modules.

12. The system of claim 9, wherein:
    the power is routed to the one of the plurality of power consumer modules by circumventing the control module; and
    the control module is configured to initiate the application of the power to the one of the plurality of power consumer modules by sending a control signal to the one of the plurality of power consumer modules.

13. The system of claim 9, wherein:
    the control module is further configured to obtain the static power sequence from at least one of an electronic hardware configuration and a software configuration.

14. The system of claim 9, wherein:
    the management network comprises an IP network external to the electronics system.

15. The system of claim 9, wherein:
    at least one of the plurality of power consumer modules comprises one of a processing unit, a disk drive, and a fan for a computing system.

16. The system of claim 9, wherein:
    at least one of the plurality of power consumer modules comprises a network element of a switch for a public switched telephone network.

17. The system of claim 9, wherein:
    at least one of the plurality of power consumer modules comprises a server blade.

* * * * *